(12) United States Patent
Hartmann et al.

(10) Patent No.: US 6,490,491 B1
(45) Date of Patent: Dec. 3, 2002

(54) METHOD AND DEVICE FOR PROGRAMMING A CONTROLLER, IN PARTICULAR IN A MOTOR VEHICLE

(75) Inventors: Stefan Hartmann, Hahnheim (DE); Kai Volkmar, Schwieberdingen (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/429,547

(22) Filed: Oct. 28, 1999

(30) Foreign Application Priority Data

Oct. 29, 1998 (DE) .......................... 198 49 809

(51) Int. Cl.⁷ ............................................. G05B 19/42
(52) U.S. Cl. .............................. 700/86; 700/18; 700/87; 700/88; 700/89; 700/19; 700/20; 701/24; 701/29; 701/31; 701/58; 701/68
(58) Field of Search .............................. 700/18–20, 86, 700/87, 88, 89–90, 170; 701/24, 29, 31, 58, 68, 9

(56) References Cited

U.S. PATENT DOCUMENTS

| 4,865,119 A | * | 9/1989 | Okada et al. ................ 165/263 |
| 5,293,610 A | | 3/1994 | Schwarz ....................... 700/21 |
| 5,583,382 A | * | 12/1996 | Wagner ...................... 307/10.1 |
| 5,826,205 A | * | 10/1998 | Koelle et al. ................ 701/102 |
| 5,880,957 A | * | 3/1999 | Aardema et al. .............. 700/86 |
| 6,026,336 A | * | 2/2000 | Sakurai et al. ................ 700/18 |
| 6,061,617 A | * | 5/2000 | Berger et al. ................. 700/18 |
| 6,151,530 A | * | 11/2000 | Ino ............................. 327/142 |
| 6,185,466 B1 | * | 2/2001 | Nicewonger ................. 700/18 |

FOREIGN PATENT DOCUMENTS

| DE | 3717012 | 12/1988 |
| DE | 19707436 | 8/1998 |
| EP | 0292644 | 11/1988 |
| WO | 9813567 | 4/1998 |

* cited by examiner

Primary Examiner—Ramesh Patel
(74) Attorney, Agent, or Firm—Martin A. Farber

(57) ABSTRACT

A method for programming a controller, in particular in a motor vehicle, which is switched from the operating mode to the programming mode by a signal which is supplied externally to the controller. In a method which ensures adequate protection against unauthorized reprogramming of the controller and is nevertheless simple to handle, the external signal is used to produce switching information in a programmable read only memory, which stores at least one operating program and/or data (which is updated at predetermined intervals) for the controller and causes the changeover to the programming mode when the controller is activated.

10 Claims, 3 Drawing Sheets

METHOD AND DEVICE FOR PROGRAMMING A CONTROLLER, IN PARTICULAR IN A MOTOR VEHICLE

FIELD AND BACKGROUND OF THE INVENTION

The invention relates to a method for programming a controller, in particular in a motor vehicle, which is switched from the operating mode to the programming mode by means of a signal which is supplied externally to the controller.

DE 37 17 012 A1 discloses a method for programming a digital controller. This controller is provided with a diagnosis interface, via which the controller is supplied with a signal, in which case this signal causes the controller to switch from an operating mode to a programming mode.

In order to report to the controller that there is a wish to switch from the operating mode to the programming mode, the signal must be applied to the diagnosis interface for at least 2.5 seconds. A further precondition is that the vehicle is not in motion during controller switching. The vehicle speed is thus detected, and reprogramming is allowed only when the vehicle is stationary.

However, the described method does not offer sufficient security to prevent the controller from being reprogrammed by unauthorized personnel.

SUMMARY OF THE INVENTION

The invention is thus based on the object of specifying a method for programming a controller which ensures adequate protection against unauthorized reprogramming of the controller, and is nevertheless simple to handle.

This object is achieved according to the invention in that the external signal is used to produce switching information in a programmable read only memory, which stores at least one operating program and/or data (which is updated at predetermined intervals) for the controller and causes the changeover to the programming mode when the controller is activated.

The advantage of the invention is that, as a result of this simple measure, information is stored which is identified after the controller has been switched off and switched on again, and is used to switch the controller to the operating mode. This is advantageous in particular if the operating voltage fails.

Particularly with regard to permanent data storage in motor vehicles, it is necessary to edit current operating data and programs continually. In this case, the method offers a convenient capability for switching the controller from the operating mode to the programming mode, with optimum utilization of memory devices included in the controller.

The signal for switching the controller advantageously changes the contents of a memory location in the programmable read only memory. There is no need to input complicated access codes and to interrogate them, since the switching signal can be produced only by special hardware.

One particularly simple option for inputting switching information into the programmable read only memory is to change a diagnosis bit, which is present in the programmable read only memory in any case, and to produce the switching information in this way.

After completion of the programming process, the switching information is automatically deleted from the programmable read only memory by the computer in the controller, by resetting the diagnosis bit to its original state again.

In a development, once the controller has identified the switching information, a program loading algorithm which is present in any case in the controller is activated, and a new operating program for the controller is then read from an external arithmetic unit.

In a further refinement of the invention, the device for programming a controller, in particular in a motor vehicle, has a controller which is provided with an arithmetic unit, in which case the arithmetic unit is connected to a programmable read only memory and to a diagnosis interface, with a signal for switching the controller from the operating mode to the programming mode being supplied to the controller via the diagnosis interface.

According to the invention, the signal for switching the controller to the programming mode produces switching information in the programmable read only memory which is connected via the arithmetic unit to the diagnosis interface and stores at least one operating program and/or data (which is updated at predetermined intervals) for the controller, in which case, once the arithmetic unit has been activated, the switching information is read by the arithmetic unit in the programmable read only memory and, once the switching information has been read, the programming mode is started.

By storing the switching information in the programmable read only memory, which is present for other purposes in any case, memory locations in other data memories in the arithmetic unit are not used. In particular, the use of the diagnosis bit reduces the need for memory space to a minimum. There is no need for any additional complexity for encrypting the switching information.

The signal for switching the controller is advantageously produced by means of a diagnosis apparatus which is present in any case.

After setting the programming mode, a new operating program for the controller is initially transferred to a random access memory of the arithmetic unit and, after deletion of those memory locations in the programmable read only memory which contain a previous operating program, the new operating program is then transferred to the programmable read only memory.

Once the transfer to the programmable read only memory has been carried out, the memory locations in the random access memory are in this case advantageously deleted, and can be used for other controller operating sequences.

In a refinement, we transfer the new operating program from an external arithmetic unit via a controller matching unit to the controller to be programmed. In this way, the new operating program can be produced, for example, in a PC, with the complete program being transferred to the controller only after the work has been completed.

In a refinement, the controller matching unit is freely configurable for matching to different interfaces and bus systems. This has the advantage that, depending on the architecture of the controller, there is no need to produce a matching circuit as an extra item for each controller, since the correct matching can be produced easily by software, by means of simple links within the controller matching unit for each controller.

The invention allows numerous embodiments. One of these will be explained in more detail with reference to the figures illustrate d in the drawings, in which:

DETAILED DESCRIPTION OF THE PREFERRED EMBODIMENT

Identical features are denoted by the same reference symbols.

In the case of devices having microcomputers, the program required to operate the microcomputer is stored in programmable read only memories. Various programmable read only memories, for example, EEPROM or flash memories, have become known for subsequent programming. Particularly when such microcomputers are used in controllers in motor vehicles, where a wide range of data has to be processed, the programmable read only memory needs to be reprogrammed. In the process, not only data but also entire programs are adapted continually.

A large number of different control and regulation sequence s are used for ready-made controllers. Technical applications in motor vehicles include, for example, fuel injection flow rate control, ABS, idle control, proximity control and cruise control. The respectively required operating programs for the controller and the associated parameters are stored in the programmable read only memory.

Figure 1:
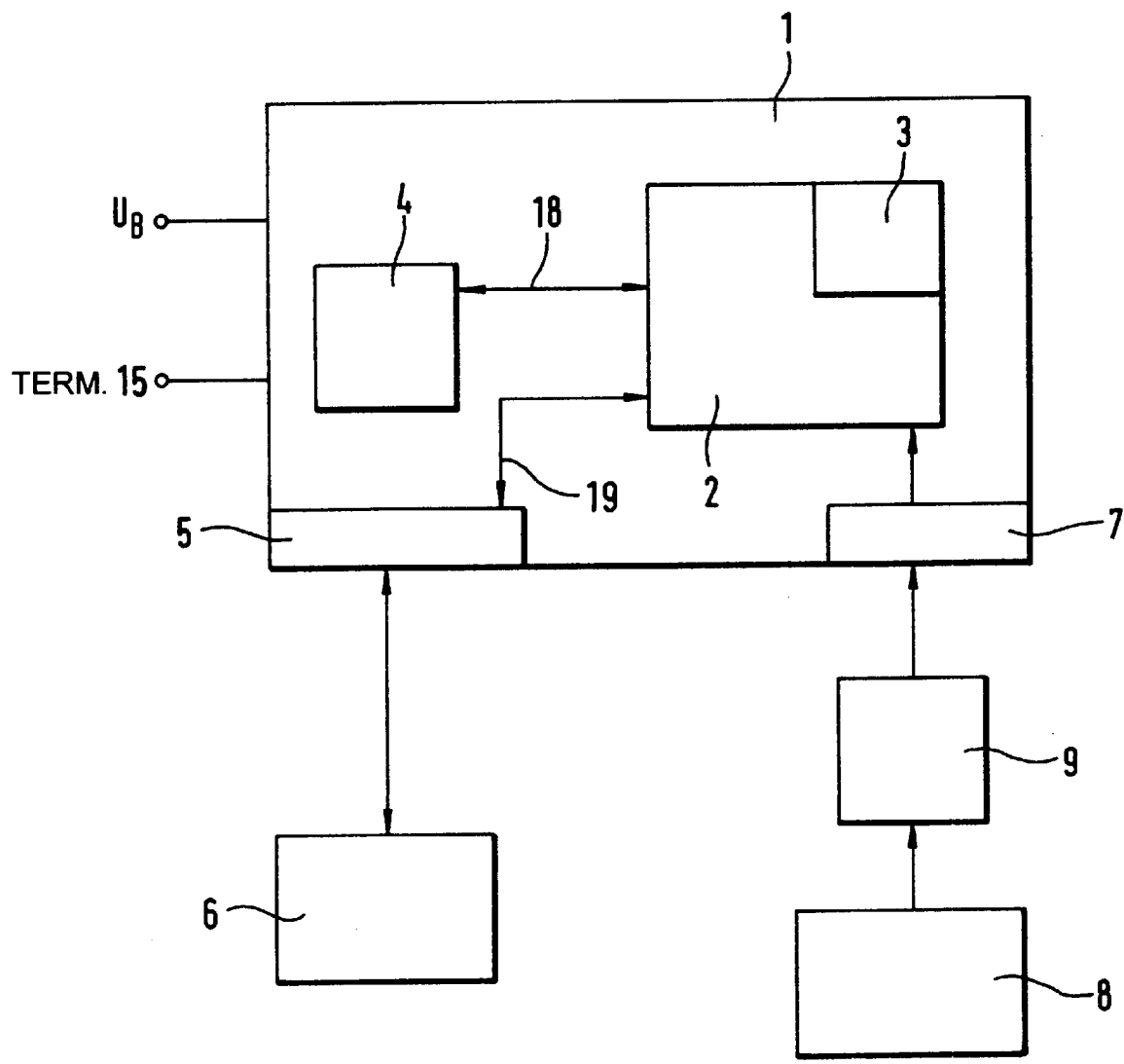
FIG. 1 shows a programming device according to the invention.

FIG. 1 shows a controller as is used in motor vehicles.

The controller 1 is in this case connected to the battery voltage $U_B$ and terminal 15 of the motor vehicle. The controller 1 contains a microcontroller 2, which has a random access memory RAM 3. The microcontroller 2 is connected via a bidirectional data line 18 to a programmable read only memory 4 which, in this case, is in the form of a flash module.

The controller 1 has a diagnosis interface 5, to which an external diagnosis apparatus 6 can be connected. This diagnosis interface 5 is connected bidirectionally (line 19) to the microcontroller 2.

Furthermore, the controller 1 has a serial interface 7, via which new data can be input into the controller 1 from an external arithmetic unit 8, for example a PC, with a data matching apparatus 9 being connected between the interface 7 and the PC 8.

Figure 2:
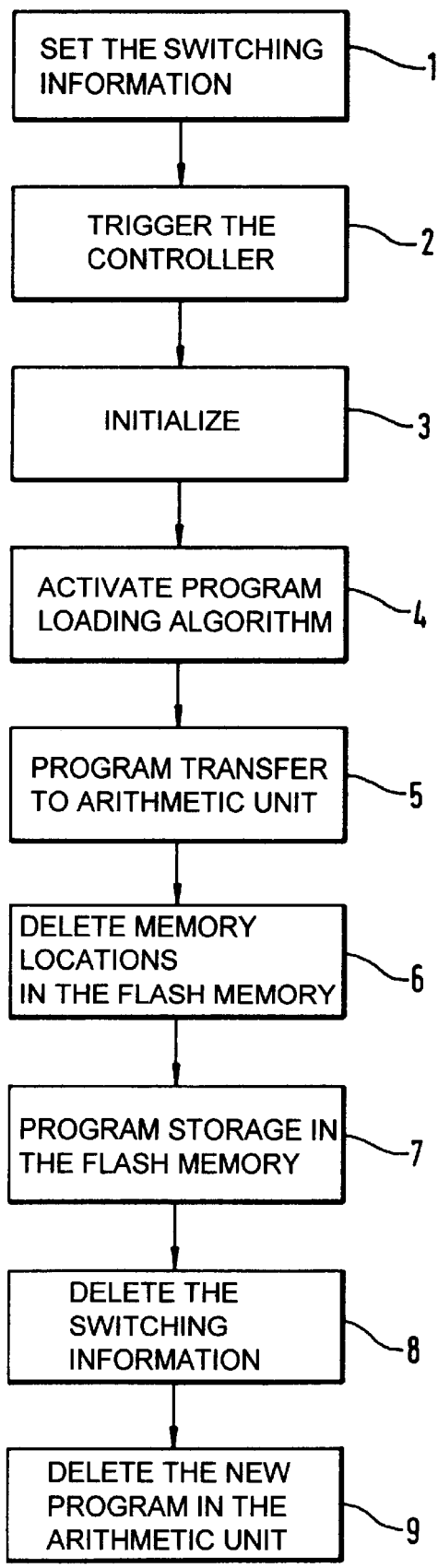
FIG. 2 shows a method for producing switching information using the programming device according to the invention.

The process for changing an operating program in the flash memory 4 will be explained with reference to FIG. 2.

In a first step, when a signal is present from the diagnosis apparatus 6, a diagnosis bit, which is present in any case, is changed in the flash memory 4 by the microcontroller 2. After subsequently resetting the microcontroller 2, an initialization process is carried out between the microcontroller 2 and the flash memory 4 (step 2). In the process, the changed diagnosis bit is read by the microcontroller 2. In this way, the microcontroller 2 receives the information that a new operating program is intended to be read to the flash memory 4.

In step 4, the microprocessor 2 activates a program loading routine which is present in its random access memory RAM 3 in any case. In step 5, the new operating program is transferred to the random access memory 3 of the microprocessor 2 from the external PC 8, via the interface 7. At the same time, in step 6, the memory locations required in the flash memory 4 are deleted by the microprocessor 2. An old operating program for the controller is in this case eliminated at the same time. Im step 7, which follows this, the microprocessor 2 writes the new program which is stored in the random access memory 3, to those memory locations in the flash memory 4 which have been prepared in this way. After the process of reprogramming the flash memory 4 has been completed, the diagnosis bit is set to normal operation (step 9). In step 10, which follows this, the random access memory 3 of the microprocessor 2 is deleted, and is available for other tasks.

Normal diagnosis tasks can be carried out with the diagnosis bit in the state it now assumes. The diagnosis bit thus not only allows the microcomputer 2 to initiate the diagnosis routine, but is at the same time used for reprogramming the microcomputer.

Figure 3:
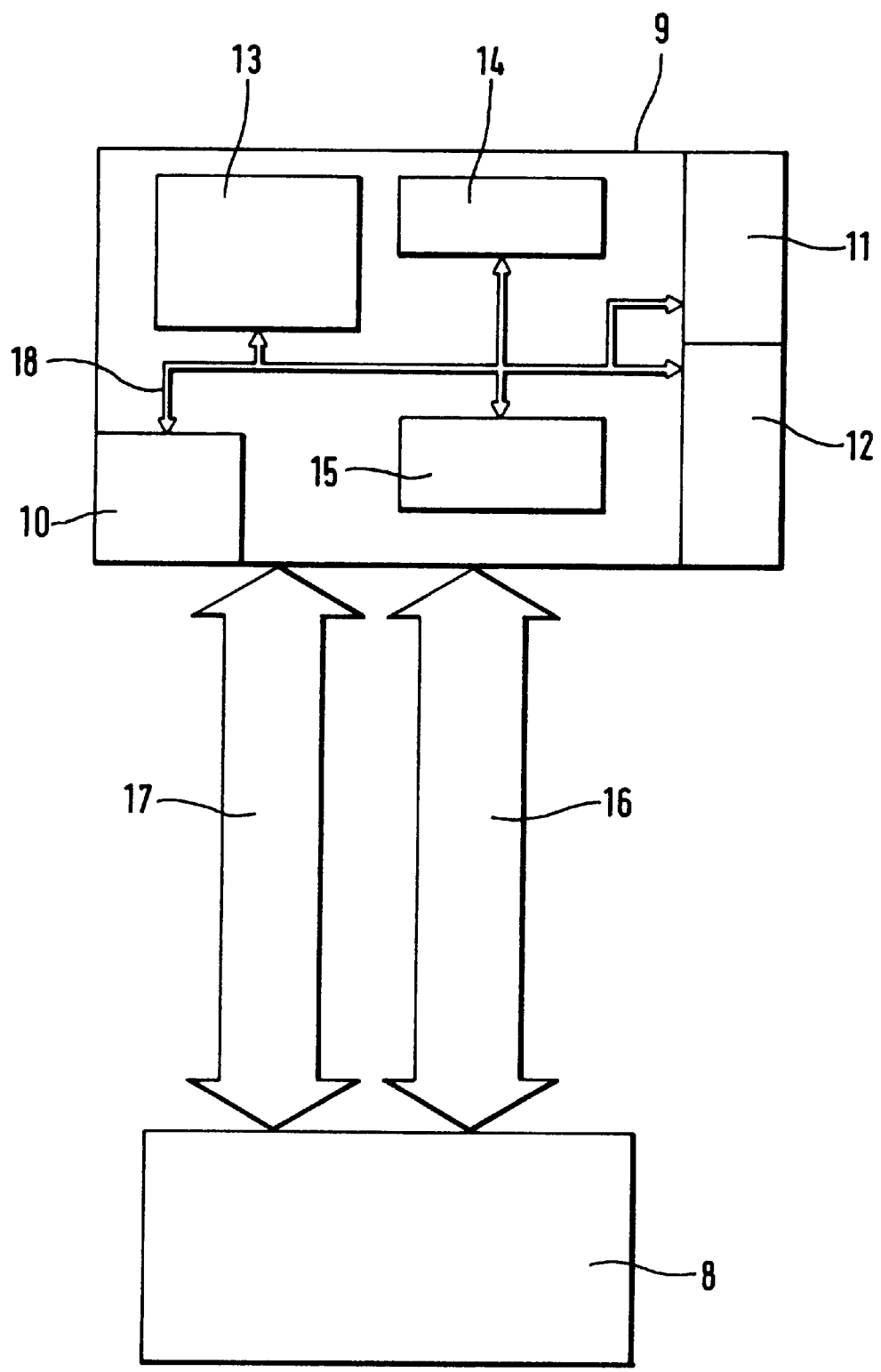
FIG. 3 shows a controller matching unit.

The data matching apparatus 9 will be described in more detail with reference to FIG. 3, this being the apparatus which allows operating data and new operating programs to be transferred from the personal computer 8 to a controller in any desired configuration.

If it is now intended to load a new operating program, which is located in the PC 8, then this program is transferred via a serial data line 17 to the controller matching unit 9.

This controller matching unit 9 comprises a computation core 13, a flash memory 14 and a random access memory 15. This controller matching unit 9 furthermore has a bus interface 11, a serial interface 12 and an A/D converter 10. Depending on the configuration of the controller 1 to be programmed, the appropriate matching program is stored in the flash memory 14.

The controllers in a motor vehicle are normally connected via a CAN bus these days. In this case, the bus interface 11 would be activated by the matching program in the controller matching unit 9, and the new operating program would be transferred from the personal computer 8, via the bus interface 11, to the controller 1, which is not illustrated in any more detail in this figure. If the controller configurations are different, then the serial interface 12 or else the A/D converter 10 can alternatively be activated by appropriate presets in the controller matching unit 9, in order to allow data interchange in this way.

We claim:

1. A method for programming a controller, in particular in a motor vehicle, which controller is switched from an operating mode to a programming mode by means of a signal which is supplied externally to the controller, wherein the external signal is used to produce switching information in a programmable read only memory (4), which stores at least one operating program and/or data, said operating program and/or data being updated at predetermined intervals, for the controller (1) and causes the changeover to the programming mode when the controller (1) is activated.

2. The method as claimed in claim 1, wherein the signal for switching the controller (1) is used to change the contents of a memory location in the programmable read only memory (4).

3. The method as claimed in claim 2, wherein the switching information is produced by changing a diagnosis bit in the programmable read only memory (4).

4. The method as claimed in claim 2, wherein, after identifying the switching information, a program loading algorithm in the controller (1) is activated, and a new operating program for the controller (1) is then read in.

5. The method as claimed in claim 3, wherein, once the programming process has been completed, the switching information is deleted from the programmable read only memory (4).

6. A device for programming a controller, in particular in a motor vehicle, in which case the controller has an microcontroller, which is connected to a programmable read only memory and a diagnosis interface, and the controller is supplied via the diagnosis interface with a signal for switching the controller from the operating mode to the programming mode, wherein the signal for switching the controller (1) to the operating mode produces switching information in the programmable read only memory (4), which is connected via the micro-controller (2) to the diagnosis interface (5) and stores an operating program and/or data, said operating program and/or data being updated at predetermined intervals, for the controller (1), and, after activation of the arithmetic unit (2), the switching information is read by this microcontroller (2) in the programmable read only memory (4), and, after reading the switching information, the microcontroller (2) activates the programming mode.

7. The device as claimed in claim 6, wherein the signal for switching the controller (1) is able to be deleted by means of a diagnosis apparatus (6).

8. The device as claimed in claim 6, wherein, after setting the programming mode, a new operating program for the controller (1) is initially transferred to a random access memory (3) in the microcomputer (2) and, after deleting those memory locations in the programmable read only memory (4) which contain a previous operating program, the new operating program is then transferred to the programmable read only memory (4).

9. The device as claimed in claim 8, wherein the new operating program is transferred from an external arithmetic unit (8), via a controller matching unit (9), to the controller (1) to be programmed.

10. The device as claimed in claim 9, wherein the controller matching unit (9) is freely configurable for matching to different interfaces and bus systems (10,11,12).

* * * * *